(No Model.)
H. HENNEBERG.
CHRISTMAS TREE HOLDER.
No. 283,392. Patented Aug. 21, 1883.
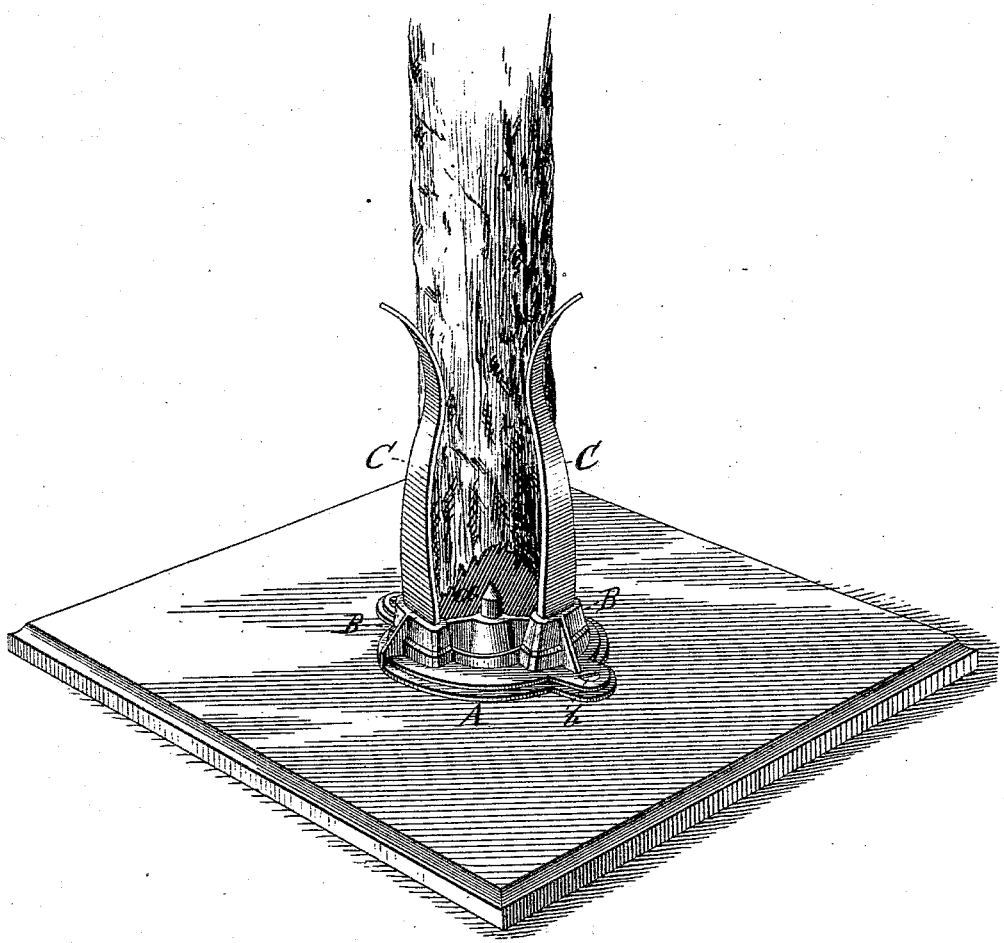
Witnesses.
Will R. Omohundro.
Louis Nolting.
Inventor
Henry Henneberg
By Wm H Lotz
Attorney

UNITED STATES PATENT OFFICE.

HENRY HENNEBERG, OF CHICAGO, ILLINOIS, ASSIGNOR TO ADOLPH SHOE-NINGER, OF SAME PLACE.

CHRISTMAS-TREE HOLDER.

SPECIFICATION forming part of Letters Patent No. 283,392, dated August 21, 1883.

Application filed December 13, 1882. (No model.)

*To all whom it may concern:*

Be it known that I, HENRY HENNEBERG, of Chicago, in the county of Cook and State of Illinois, have invented certain new and useful Improvements in Christmas-Tree Holders; and I do hereby declare that the following is a full, clear, and exact description thereof, reference being had to the accompanying drawing, and to the letters of reference marked thereon, which form a part of this specification.

This invention consists in a device, as hereinafter described and claimed, for holding and supporting Christmas-trees.

The drawing represents a perspective view of my improved device attached to a suitable base and having a tree in position therein.

Heretofore it has been customary to shave the base of the tree tapering and then drive such tapering lower end into a socket or hole in the base support. Considerable difficulty has been experienced in thus securing trees, as in practice the branches of the tree would be broken or otherwise damaged, and rigid and steady support was seldom afforded the tree sufficiently to prevent it swinging back and forth when loaded with lights, ornaments, &c.

A represents an iron plate having a central upwardly-projecting point, $a$, and three, or any desired number of sockets or slots, B, that are radiately equidistant from the central point, $a$.

C represents curved leaf-springs, whose lower ends are placed or secured within said sockets or slots B. These springs and the plate A may be painted, japanned, or otherwise ornamented to assume a tasteful appearance.

$b$ represents wood-screws, by which the plate A may be secured to a suitable base or pedestal, D, of any suitable or desired material or shape.

By means of this device a tree, E, independent of the diameter of its trunk at its base or cut-off end, is placed centrally between the leaf-springs and pushed downward upon the point $a$, which will enter the sap-channel, and thus afford a central support to the tree and hold it to a considerable extent. The leaf-springs C will each press firmly against the sides of the tree and clamp it securely and rigidly in an upright position. It will be observed that by this arrangement it is entirely unnecessary to prepare the butt of the tree for its support, but that all that is necessary is simply to cut the trunk off straight and place it within or upon the plate A. The support afforded the tree by the central projecting point, $a$, is equal to that secured by the old method of first tapering the lower end of the trunk and then placing the same within a socket prepared to receive it, while as the leaf-springs C extend some distance upward from the plate A a comparatively large surface of the trunk is thereby held in rigid clamping position, resulting in the obtainment of an exceedingly firm and rigid support of the tree, without the possibility of its being overturned or easily shaken and the articles thereon thrown down.

The entire device is very simple in construction and arrangement. It can be manufactured and sold very cheaply. It is capable of continued use for a very long time, as there are no parts to get out of order or become damaged by ordinary usage, and it can be readily taken apart and stowed away in small compass whenever desired.

Instead of providing the plate A with sockets B, for inserting the lower ends of springs C, such plate A may be provided with flanges, against which the lower ends of springs C are secured by screws or rivets; or any other suitable device for attaching such springs to the plate may be adopted for this purpose; and I do not wish therefore to be restricted to the particular construction herein described.

What I claim is—

1. The tree-holder herein described, consisting of plate A, having central upwardly-projecting point, $a$, that will enter the sap-channel of the tree, and having secured radially, at equal distance from central point, $a$, a series of upwardly-projecting leaf-springs, C, that will accommodate themselves to the diameter of the tree, and will hold it steady, all substantially as and for the purpose set forth.

2. The tree-holder herein described, consisting of a plate, A, having central point, $a$, and sockets or slots B, and the leaf-springs C, substantially as and for the purpose set forth.

In testimony that I claim the foregoing as my invention I affix my signature in presence of two witnesses.

HENRY HENNEBERG.

Witnesses:
LOUIS NOLTING,
R. G. SCHMID.